US012214570B2

(12) United States Patent
Neemann

(10) Patent No.: US 12,214,570 B2
(45) Date of Patent: Feb. 4, 2025

(54) METHOD OF MANUFACTURING A PAPER BAG FOR CONTAINING SANITARY PRODUCTS

(71) Applicant: M. Neemann OHG, Leer (DE)

(72) Inventor: Cord Neemann, Leer (DE)

(73) Assignee: Neeman Liteflexpackaging GmbH & Co. KG, Leer (DE)

( * ) Notice: Subject to any disclaimer, the term of this patent is extended or adjusted under 35 U.S.C. 154(b) by 90 days.

(21) Appl. No.: 18/308,377

(22) Filed: Apr. 27, 2023

(65) Prior Publication Data

US 2023/0347614 A1 Nov. 2, 2023

(30) Foreign Application Priority Data

Apr. 29, 2022 (EP) .................................... 22170820

(51) Int. Cl.

| | |
|---|---|
| ***B31B 70/74*** | (2017.01) |
| ***B31B 70/10*** | (2017.01) |
| ***B31B 70/26*** | (2017.01) |
| ***B31B 70/64*** | (2017.01) |
| *B31B 155/00* | (2017.01) |
| *B31B 170/20* | (2017.01) |

(52) U.S. Cl.

CPC .............. *B31B 70/79* (2017.08); *B31B 70/10* (2017.08); *B31B 70/26* (2017.08); *B31B 70/64* (2017.08); *B31B 2155/00* (2017.08); *B31B 2170/20* (2017.08)

(58) Field of Classification Search

CPC ......... B31B 70/79; B31B 70/64; B31B 70/26; B31B 70/10; B31B 2155/00; B31B 2170/20

See application file for complete search history.

(56) References Cited

U.S. PATENT DOCUMENTS

| | | | | |
|---|---|---|---|---|
| 2,311,017 A * | 2/1943 | Anderson | ................ B43M 3/04 | 53/376.3 |
| 2,544,735 A * | 3/1951 | Strickler | ................. B65B 35/52 | 53/157 |
| 2,633,286 A * | 3/1953 | Claridge | ................. B31B 70/62 | 493/217 |

(Continued)

FOREIGN PATENT DOCUMENTS

| | | | |
|---|---|---|---|
| DE | 4117428 A1 * | 12/1992 | |
| DE | 4425368 A1 * | 1/1996 | .............. B31F 5/022 |

(Continued)

*Primary Examiner* — Lucas E. A. Palmer

(74) *Attorney, Agent, or Firm* — Harness, Dickey & Pierce, P.L.C.

(57) ABSTRACT

A method of making a paper bag for containing sanitary products, which includes conveying a paper web having a first side and a second side in a conveying direction; Applying a sealable coating to the first side of the paper web in sections, and applying second coating strips extending substantially transversely to the conveying direction and spaced apart from one another in the conveying direction; folding onto itself the first side of the paper web along the direction of conveyance to form a two-ply web having a folding configuration; and heat sealing the second coating strips to form side seams each defining a bag interior; separating the two-ply web along the heat sealed side seams to separate the two-ply web into individual paper bags.

22 Claims, 9 Drawing Sheets

(56) References Cited

U.S. PATENT DOCUMENTS 3,168,016 A * 2/1965 Kehr .................... B65B 5/022 53/550
3,850,724 A * 11/1974 Lehmacher ........... B29C 69/006 156/518
3,980,225 A * 9/1976 Kan ..................... B65D 75/008 383/122
4,016,806 A * 4/1977 Schuster ................. B31B 70/00 493/212
4,282,055 A * 8/1981 Bosse ..................... B31B 70/00 156/499
4,537,586 A * 8/1985 Gale ....................... B31B 70/00 493/224
4,761,080 A * 8/1988 Schirmer ............... B65D 31/02 383/114
5,041,072 A * 8/1991 McClelland .......... B31B 70/626 493/212
5,165,799 A * 11/1992 Wood .................. B29C 65/1483 383/104
5,237,799 A * 8/1993 van Boxtel ............. B31B 70/00 493/198
5,928,749 A * 7/1999 Forman .................. B65D 33/34 229/87.01
6,574,939 B1 * 6/2003 Heijnen ................ B65B 61/188 53/139.2
10,017,309 B2 * 7/2018 Dahlqvist ............. B65B 11/004
2002/0103067 A1 * 8/2002 Bois ................... B65D 33/2508 383/120
2003/0053720 A1 * 3/2003 Smith .................. B65D 33/002 493/212
2004/0001927 A1 * 1/2004 Moran .................. B65D 33/24 428/36.5
2016/0176579 A1 * 6/2016 Brauer .................... B31B 70/00 493/227
2016/0228309 A1 * 8/2016 Ekstedt ............... A61F 13/5514

FOREIGN PATENT DOCUMENTS

EP 3901054 A1 * 10/2021 ........... B65D 75/008
WO WO-2010106567 A1 * 9/2010 ............. B31B 19/86
WO WO-2016148587 A1 * 9/2016 ........... B07C 5/3412

* cited by examiner

METHOD OF MANUFACTURING A PAPER BAG FOR CONTAINING SANITARY PRODUCTS

CROSS-REFERENCE TO RELATED APPLICATIONS

This application claims the benefit and priority of European Patent Application No. 22170820.9 filed Apr. 29, 2022. The entire disclosure of the above application is incorporated herein by reference.

BACKGROUND OF THE INVENTION

Technical Field

The invention relates to a method of manufacturing a paper bag for containing sanitary products.

Discussion

Sanitary product packaging made of PE film is well known in the prior art. Although this is an economically and ecologically highly optimized packaging application, there are preferences among consumers for the material paper—due to the assumption that it would be more environmentally friendly. However, a particular challenge here is that separation and simultaneous welding of the side edges of the bags cannot be achieved with this material by means of separation welding as is the case with PE bags. For this function, papers with an additional film layer, for example of polyethylene PE, are often used. However, this can limit recyclability and compostability. Thus, for example, coatings that are film-free and contain a large proportion of biodegradable ingredients, or have good removability from the paper layer, are preferable. Furthermore, a further challenge for paper with a sealable coating is to bond packaging exteriors, in which the paper layer of the materials face one another, for example in corner areas.

A process for producing a paper bag is known from U.S. Pat. No. 5,165,799 A, wherein the bag has opposing heat-sealed side seams. A similar process is known from DE 41 17 428, in which a paper web is fed to a folding device via a feed device, a hotmelt being applied to the paper web before folding, which is sealed after folding of the paper web. Another process is known from DE 44 25 368 A1.

Another paper bag for holding sanitary products is known, for example, from EP 3 901 054 A1. This has a paper layer and a sealable coating arranged thereon at least in sections, which faces an interior of the bag, the bag being heat-sealed over side edges having the sealable coating in each case over a predetermined width.

One challenge is to provide the paper bags as cost-effectively and environmentally friendly as possible. This includes, for example, the use of the smallest possible amount of sealable coating material per bag, the complete application of the coating material required for the entire bag and the partial sealing of the coating material, and the possibility of producing bags of different sizes in one and the same production process. Furthermore, one challenge is to reduce tooling costs while at the same time enabling the production of the greatest possible number of variants, for example by not having to keep a separate printing form ready for each additional pouch variant. In addition, the aim is to minimize the number of work steps, with all the process steps required to produce the pouches being completed in a single operation. This is accompanied by the challenge of minimizing makeready times and makeready costs, which are incurred, for example, when preparing the system for different pouch variants or when preparing different operations.

SUMMARY

It is therefore one aspect of the invention to improve a process for producing a paper bag for holding sanitary products in such a way that it is particularly efficient and flexible.

Accordingly, a method of manufacturing a paper bag for containing sanitary products is provided, comprising:

Conveying a paper web having a first side and a second side in a conveying direction;

Applying a sealable coating to the first side of the paper web in sections, wherein applying the sealable coating to the first side of the paper web in sections comprises applying first coating strips extending substantially in the conveying direction and spaced apart from one another transversely to the conveying direction and applying second coating strips extending substantially transversely to the conveying direction and spaced apart from one another in the conveying direction;

Folding onto itself the first side of the paper web along the direction of conveyance to form a two-ply web having a folding arrangement;

Heat sealing the second coating strips to produce side seams each bounding a bag interior;

Separating the two-ply web along the heat-sealed side seams to separate the two-ply web into individual paper bags;

wherein applying the sealable coating to the first side of the paper web section by section further comprises applying coating sections extending toward each other in the conveying direction in the area of the folding arrangement, wherein at least two of first coating strips, second coating strips and coating sections are produced by different application methods.

It is envisaged that the coating of the bags can be carried out inline in the course of bag production. This means that the paper web does not have to pass through an expensive printing press several times in order to produce the print and the coating, which leads on the one hand to shorter throughput times and on the other hand to the avoidance of waste. In the course of the process, both the coating sections intended for providing the bag base body and the coating sections intended for closing the bags can be applied. Side seams as well as head gusset seams may be provided for providing the bag base body, and the coating section or sections provided for closing the bag may be provided in the area of a bag opening. The side seams and the head gusset seams can subsequently also be sealed inline in the same manufacturing process, while the coating sections for closing the pouches are not sealed inline, but are sealed in a separate process after the pouches have been filled, for example after delivery of the empty pouches to a customer who packs the hygiene articles in the pouches and subsequently seals the pouches. It may be provided that a different coating material is used for the first coating strips than for the second coating strips and the coating sections. Using we different coating materials or coatings for different elements of the coating pattern may thus comprise using a different coating material for the pouch structure than for the closure opening, since the requirements for the filling closure are different than for the pouch structure. In particular, it may be provided that the coating material for the first coating strips is heat reactivatable, so that the first coating strips can be heat reactivated again, i.e. developing a sealing effect, in the subsequent packaging process, i.e. after completion of the bag production, for closing the bag. This may include the property that the first coating strips do not produce a sealing or adhesive effect between manufacture and filling, i.e. in the cooled state, and the bags can therefore be stored or handled without additional protection of the first coating strips, for example in the form of a peel-off strip. It may be provided that the sealing time of the coating material used for the first coating strips is less than 400 ms. Alternatively, it may be provided that the same sealable coating material is used for the first and second coating strips so that the time and effort required to provide the pouches is minimized. Furthermore, the widths and application positions of the coating strips can be individually adapted for each bag size to be produced, so that only the necessary amount of coating material needs to be applied in each case without having to coat the entire paper.

It is also conceivable that the first coating strips are applied by means of an endless roll. The axis of rotation of the endless roll can be aligned perpendicular to the direction of conveyance of the paper web. The endless roll may be configured such that the distance between the two first coating strips can be adjusted. This allows the process to be used to produce any bag size. In particular, a flexographic printing press may be provided as the coating machine for producing the first coating strips. Alternatively, a gravure printing press or a laminating machine with a corresponding applicator unit can also be provided.

The section-by-section application of the sealable coating to the first side of the paper web can comprise the application of the first coating strips in a first process step and the application of the second coating strips and/or the coating sections in a second process step. The application of the first coating strips may be carried out by means of a first coating device and the application of the second coating strips and/or the coating sections may be carried out by means of a second coating device.

It may be provided that the second coating strips are regularly spaced from each other in the conveying direction. The first coating strips are not sealed together, so that a bag opening remains for subsequent sealing after the bag has been filled with sanitary articles. Further, it may be provided that the heat-sealed side seams are separated substantially centrally. The first and/or the second coating strips may have a rectilinear shape.

The first coating strips may be arranged on opposite side edges of the paper web, so that the first coating strips, when the paper web is folded on top of each other, define a bag opening through which the bag interior is accessible.

In particular, it can be provided that at least one free area, which is free of sealable coating, is formed in each case between the opposing first coating strips and two adjacent second coating strips. The free area can be rectangular, for example.

Furthermore, the folding onto itself may comprise the insertion of a head gusset in the area of the folding arrangement. In particular, the head gusset can be formed in such a way that the folding arrangement has three folds, so that a fold is inserted between the front and rear bag walls. The head gusset may serve, for example, to create a stand with which the filled bag can be placed upright without falling over. Furthermore, the head gusset can have the effect that the bag has an attractive appearance or that more articles can be accommodated in the bag. When the head gusset is inserted, the folding arrangement can have a W-shaped cross-section.

It may be provided that the coating sections are spaced from the second coating strips transversely to the conveying direction. Alternatively, the coating sections can also be directly adjacent to the second coating strips. In this case, the width of the coating sections transverse to the conveying direction may substantially correspond to the width of the paper web section provided for the head gusset. The coating sections may have a rectangular shape. The coating sections may be substantially centered with respect to the paper web width, except for the projecting material section provided for the wicket pins. The width of the coating sections may correspond to the width of the section of material provided for the head gusset. With respect to the paper web width, the coating sections may be aligned with each other. A further clearance area may be provided between the coating sections extending towards each other so that the coating sections are spaced apart.

It is conceivable that the section-by-section application of the first and/or the second coating strips and/or the coating sections to the first side of the paper web takes place only on one side of one of the paper web sections separated by the folding arrangement and to be folded onto one another. This has the advantage that the surfaces of the paper web sections do not necessarily have to meet with high precision during folding.

The coating pattern applied in sections, comprising the first coating strips and the second coating strips and, if appropriate, the coating sections, can alternatively be of mirror-symmetrical design in the conveying direction, so that, when the paper web is folded open, sections having a sealable coating in each case are folded onto one another.

Further, it may be provided that partially heat sealing the applied sealable coating further comprises heat sealing the coating sections to create head gusset seams.

In addition, the folding of the paper web can be off-center with respect to the paper web width so that one of the layers of the two-ply web has a protruding section of material. This may be provided for the insertion of wicket pin holes so that the bags can be stacked on stacks of pins.

It can also be provided that the first coating strips are applied to the paper web without interruption. This allows them to extend continuously over the paper web in the paper conveying direction. It can thus be provided that the first coating strips extend over the entire width of the bag.

The method can further provide that the distance of the first coating strips from each other and/or the respective width of the first coating strips are variably adjustable, for example using the above-mentioned appropriately configured endless roller. Furthermore, the distance of the second coating strips from each other and/or the length and/or the width of the second coating strips can be variably adjustable. Furthermore, depending on the bag size to be produced, the dimensions of the coating sections can be variably adjustable in and transversely to the conveying direction.

It may be provided that the sealable coating is applied by means of gravure printing and/or flexographic printing and/or nozzle application and/or spraying. Furthermore, at least two of first coating strips, second coating strips and coating sections are produced by different application methods. As a result, the optimum coating techniques can be used for the technical requirements of the different coating sections in each case. It may be provided that the first coating strips running along the conveying direction are applied by means of at least one rotating printing forme, that is, for example, by gravure printing and/or flexographic printing. It may be provided that the position of the rotating printing forme is displaceable transversely to the conveying direction of the paper web. It may further be provided that the second coating strips extending transversely to the conveying direction and/or the coating sections are applied by means of nozzle application and/or spraying. Alternatively, it may be provided that all coating sections are produced by means of the same coating technique. It can be provided that the application of the second coating strips and/or the coating sections is carried out in a repeat-controlled manner and/or by means of at least one control mark.

The method may further comprise printing a design on the second side of the paper web prior to applying a sealable coating to the first side of the paper web in sections.

In addition, the method may include the step of: Inserting wicket pin holes in the overhanging section of material. Further, after separating the two-ply web along the heat-sealed side seams to separate the two-ply web into individual paper bags, the method may comprise pinning the individual paper bags onto wicket pins.

Further, the method may comprise punching the pouches after heat sealing the second coating strips to remove corner sections in the region of the head gusset. It may be provided that heat sealing the coating sections occurs after the punching. It may be provided that the separating of the pouches occurs after the heat sealing of the coating sections.

Further, the method may further comprise stacking the separated bags on wicket pins using the inserted wicket pin holes.

It can be provided that for feeding the paper web, the paper web is unwound from a paper roll.

Further, the method may comprise generating a printing pattern on the second side of the supplied paper web. In addition, the process may comprise applying a further sealing layer to the second side, at least in sections. In this way, folds formed on the bag body during filling of the bags can be fixed.

DRAWINGS

Further details of the invention are explained with reference to the figures below. Thereby shows:

DESCRIPTION OF THE PREFERRED EMBODIMENTS OF THE INVENTION

Figure 1:
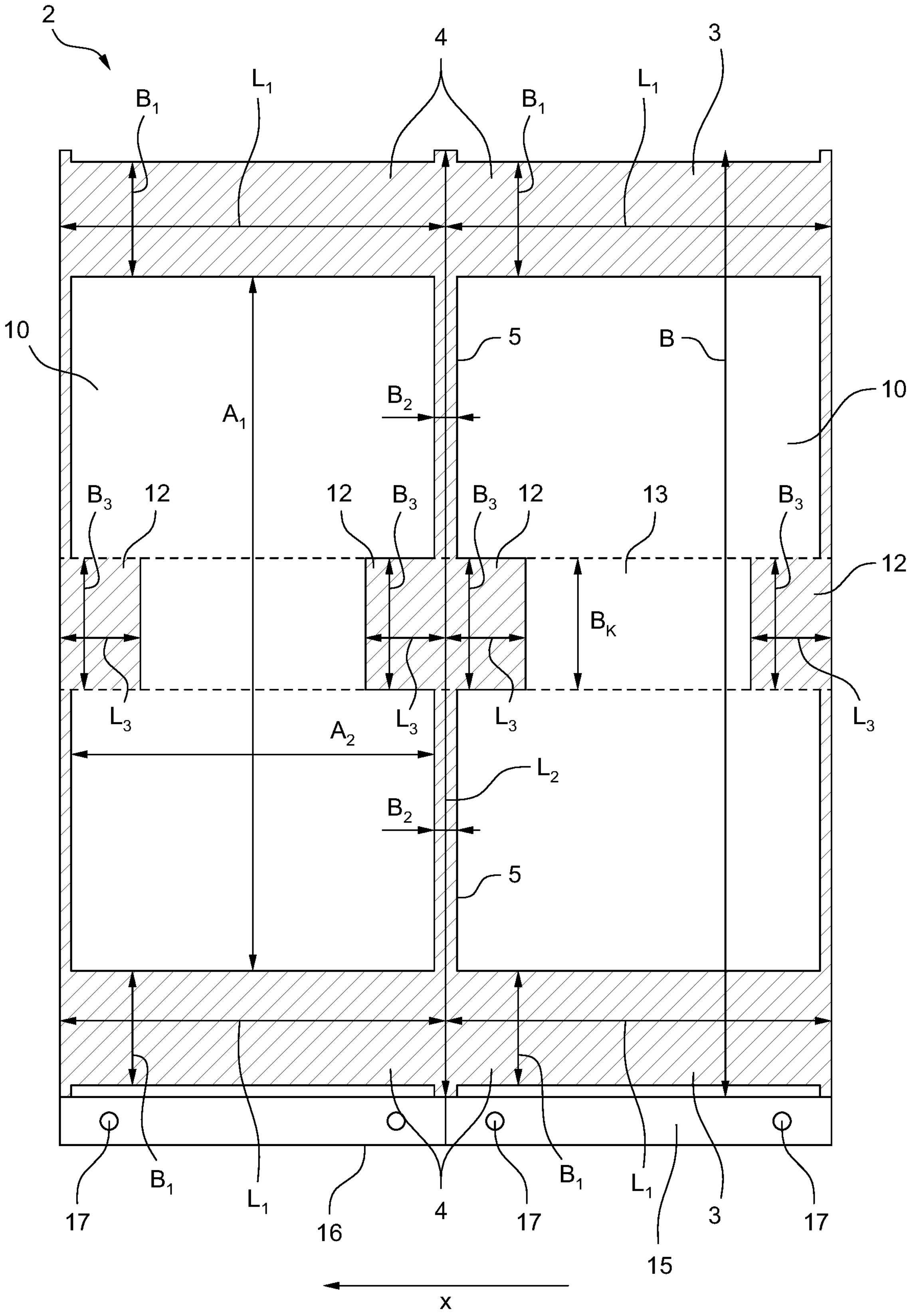
FIG. 1 is a first embodiment of a paper web section coated in sections with sealable coating material.

FIG. 1 shows a section of a paper web 2 with a paper web width B conveyed in a conveying direction X, to which a mirror-symmetrical coating pattern of sealable coating material 3 is applied. This has first coating strips 4 running in the conveying direction X, which extend continuously on opposite outer sides of the paper web 2. After the bags 1 have been produced, the first coating strips 4 serve as a border around a bag opening 9, which is not initially sealed but is sealed only after the bags 1 have been filled with hygiene articles. For each paper bag section, the first coating strips 4 have a length L1 which, due to the continuous application, are each seamlessly adjacent to the first coating strips 4 of the adjacent paper bag sections. In the embodiment shown, the length L1 is 336 mm. The first coating strips 4 have a width B1, in the example shown of 100 mm, and are slightly spaced in the transverse direction from the outer edges of the paper web 2, so that it is avoided that the coating compound builds up at the edge in the printing process, because this remains stuck on the impression cylinder/medium in the edge region projecting over the paper web. The width B1 of the first coating strips 4 is determined by the tolerance range required by the fillers when closing the bags (e.g. due to filling height variations). In the embodiment shown, this engagement area has a width of 10 mm. The first coating strips 4 are spaced apart from one another by a distance A1 in the transverse direction of the paper web 2. The second coating strips 5 serve to produce side seams 8 of the paper bags 1 and, in contrast to the first coating strips 4, are sealed immediately after folding of the paper web 2. The second coating strips 5 extend substantially transversely to the conveying direction X and are spaced apart from one another in the conveying direction X by a distance A2, which in the example shown is 316 mm. Apart from the projecting material section 15, the second coating strips 5 extend over the entire paper web width and have a length L2, which in the example shown is 825 mm. The width B2 of the second coating strips 5 is 20 mm, as shown by way of example. The first and the second coating strips 4, 5 annularly enclose a free area 10 in which no coating material 3 is applied to the paper web 2. The size of the free area 10 corresponds substantially to the "show" area printed on the outside of the bag, and outside this area the bag is sealed.

The projecting material section 15 has two wicket pin holes 17 per paper bag section and has a width of 42 mm in the example shown. The second coating strips 5 each have coating sections 12 centrally adjacent thereto or overlapping therewith, which serve to seal the head gusset 11. The head gusset 11 is formed as part of the folding arrangement 6 by a paper web section 13 provided for this with a width BK, in the example shown 115 mm. When the paper web 2 is unfolded, the head gusset 11 is thereby inserted in a W-shape into the folding area. The coating sections 12 are arranged opposite one another at the outer edges of the bag and extend mutually towards one another, the free area 10 extending between the two coating sections 12. The coating sections 12 each have a length L3 in the conveying direction X and a width B3, which in the example shown are 115 mm and 70 mm respectively.

Figure 3:
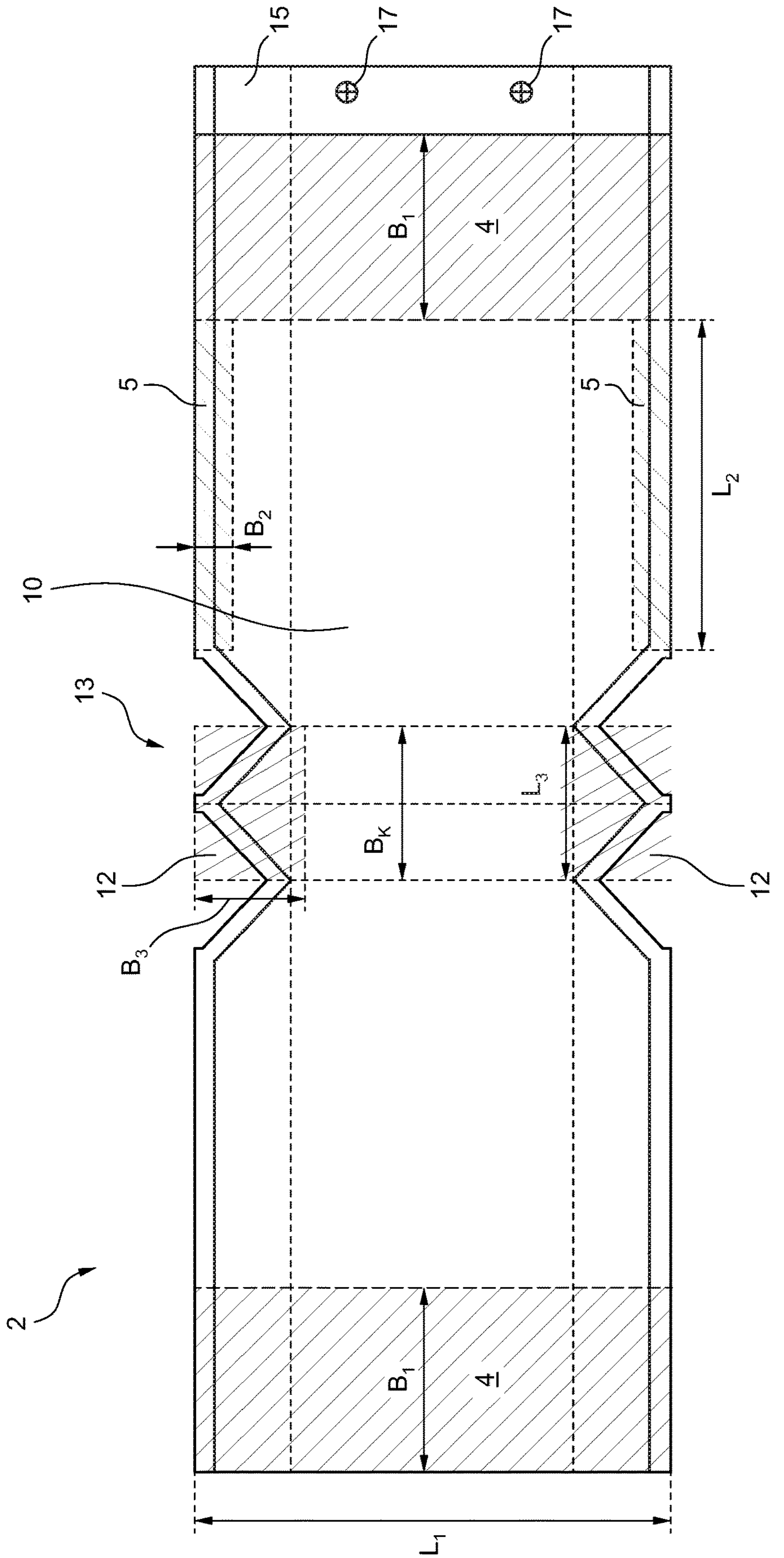
FIG. 3 is a second embodiment of a paper web section coated in sections with sealable coating material.

An alternative embodiment of a coating pattern applied to a paper web section is shown in FIG. 3. The first coating strips 4 applied by means of an endless roll extend over the entire paper bag width, i.e. corresponding to the length L1, and consist of a first coating material which can be heat reactivated. The coating strips 4 have a width B1 and are arranged in an upper region of the bag, and may be immediately adjacent to the material section 15 or spaced therefrom by a slight distance of, for example, 5+/−1 mm. This allows the sealable coating to be adhered to the paper web 2 during the manufacturing process. In the period between bag manufacture and filling of the bag, the coating 4 is inactive as soon as it has cooled down after application, so that it does not develop any adhesive effect. As a result, the bag can be stored easily and layer 4 does not need to be provided with a peel-off strip. The layer 4 can then be heat-activated again for the process of filling the bag 1 with articles, so that an adhesion effect is again provided for closing the bag 1. The second coating strips 5 and the coating sections 12 comprise a second coating material which is suitable for immediate bag production after application, since in the method the bag body is produced immediately after application of the second coating strips 5 and the coating sections 12, that is, it is folded onto one another. As a result, a coating material which cannot be heat reactivated can be used. The second coating strips 5 with a length L2 and a width B2 are spaced from the coating sections 12 transversely to the conveying direction X and directly adjoin or open into the coating area 4. This means that the coating area 4 and the coating strips 5 do not overlap or overlap only slightly. Furthermore, the second coating strips 5 are applied only on the right side of the paper web section, or the coating sections 12 are applied only in the area of the inwardly folded section of the head gusset 6. With sufficient coating application, only one side of each of the two sections to be joined thus needs to be provided with coating material. This has the advantage that the folding does not have to be carried out with the precision that would be necessary if the coating material were applied to both sides.

Figure 4:
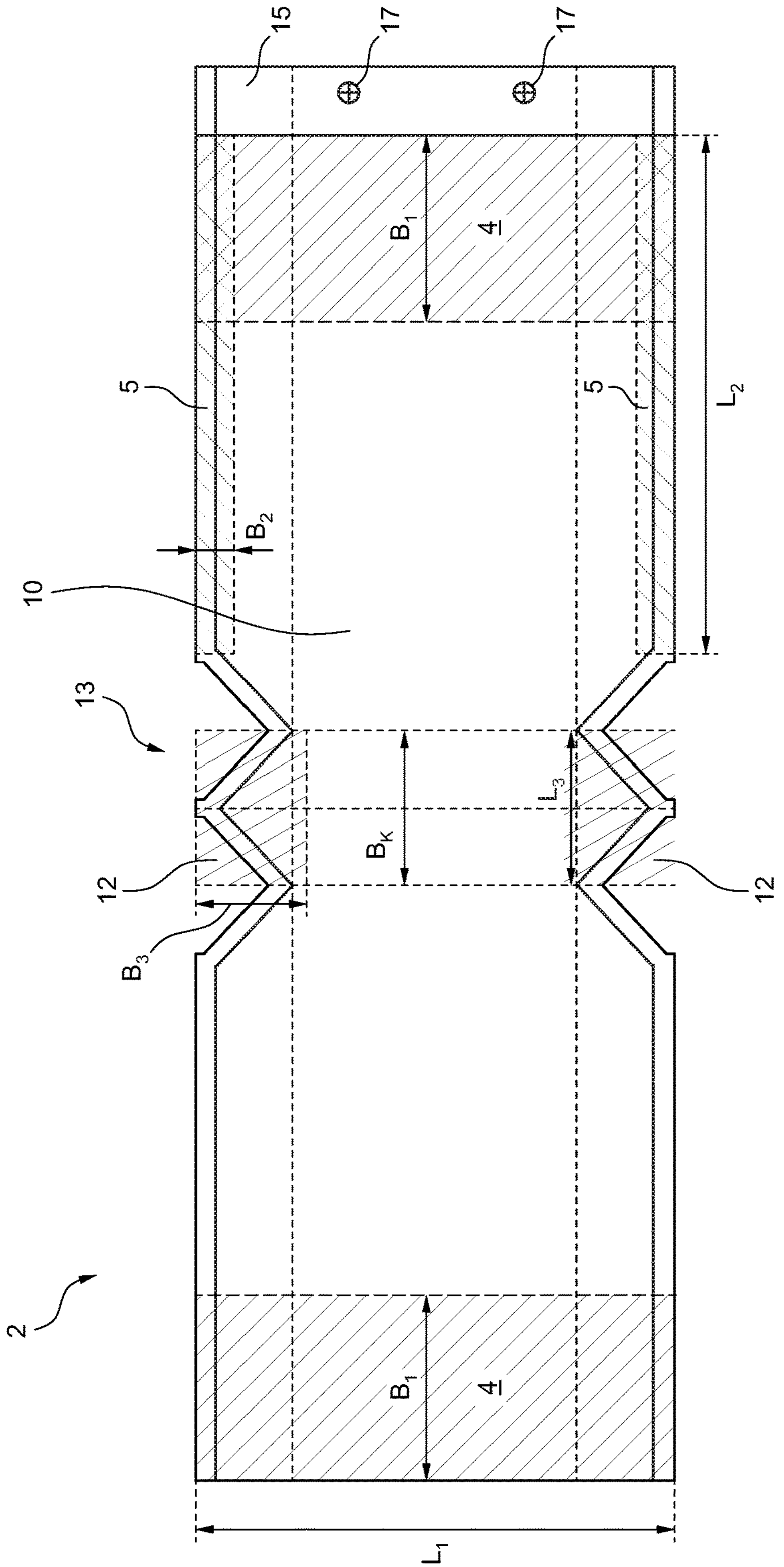
FIG. 4 is a third embodiment of a paper web section coated in sections with sealable coating material.

FIG. 4 essentially shows the coating pattern according to the second embodiment shown in FIG. 3. However, the third embodiment shown in FIG. 4 differs from the second embodiment in that the coating strips 5 have a greater length L2 and additionally extend over the entire width B1 of the coating area 4. As a result, the coating strips 5 and the coating area 4 overlap in the third embodiment.

Figure 5:
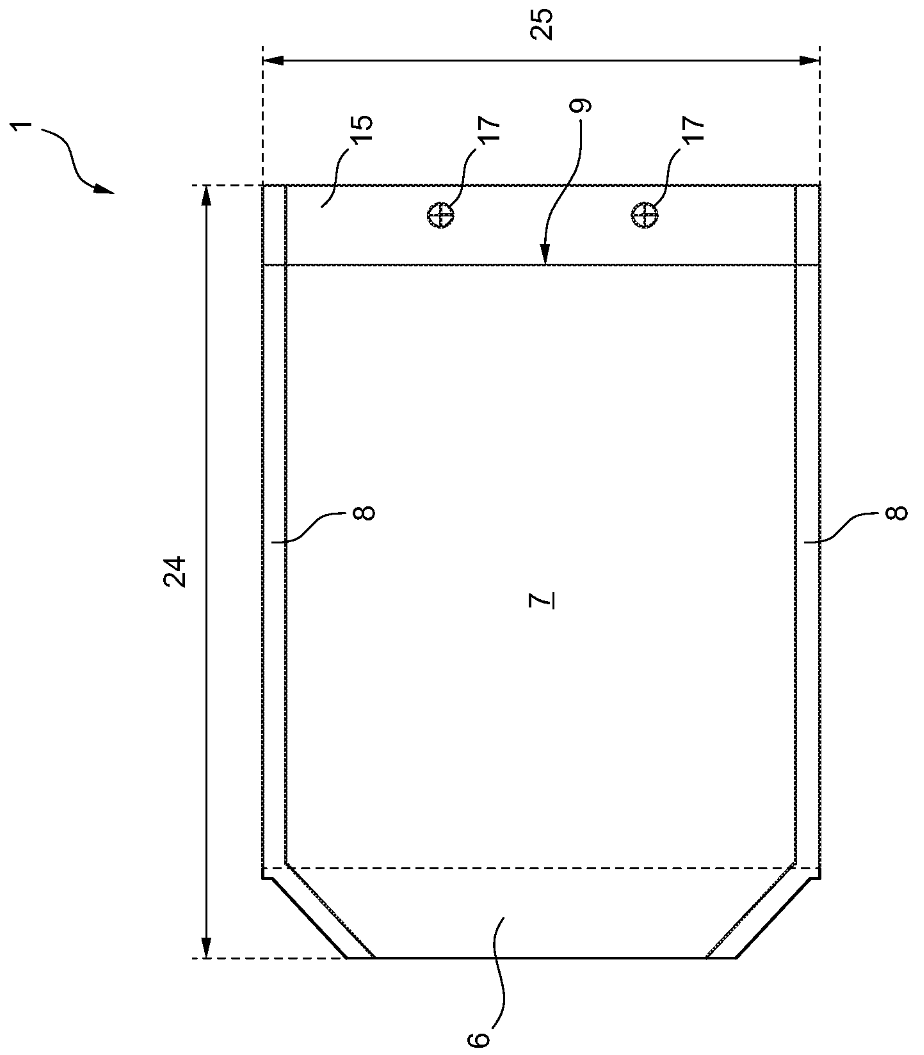
FIG. 5 is a front view of an unfilled paper bag according to the embodiment shown in FIG. 3 or FIG. 4.

FIG. 5 shows the front view of a paper bag 1 produced from a paper web section as shown in FIG. 1. This has a longitudinal dimension 24 and a transverse dimension 25. The two-ply web 7 of the bag 1 is joined by side seams 8 produced by the second coating strips 5. Opposite the head gusset is a filling opening 9, which is directly adjacent to the wicket section 15 having two wicket holes 17. Surrounding the filling opening 9 from the inside are the first coating sections 4 (not shown), which can be heat reactivated after filling the bag to seal it. After the coating pattern has been applied, half of the paper web 2 is folded on top of each other along a folding arrangement 6 running in the conveying direction X, thereby forming a two-ply web 7 whose plies each represent a bag front and a bag back. Due to the symmetrical arrangement of the coating pattern, uniformly coated areas are folded on top of each other in each case when the paper web is folded. During folding, the head gusset 11 is inserted as described above. Subsequently, the second coating strips 5 are sealed so that in each case bag bases with bag interiors separated from one another are formed. The second coating strips 5 can be sealed up to the areas which overlap with the first coating strips 4. The first coating strips 4 are not sealed and surround a bag opening 9 remaining in the open state. Subsequently, protruding areas of the head gussets 11 are removed by punching. This concerns the corner areas connected to each other and protruding from the bag. After punching, the coating sections 12 are sealed. After sealing the second coating strips 5 and the coating sections 12 and after punching, the paper web 2 is separated into separate bags 1 along separation lines 16. The separation lines 16 run longitudinally in the center of the second coating strips 5, so that these are each separated into two side seams 8 of two adjacent bags 1.

Figure 2:
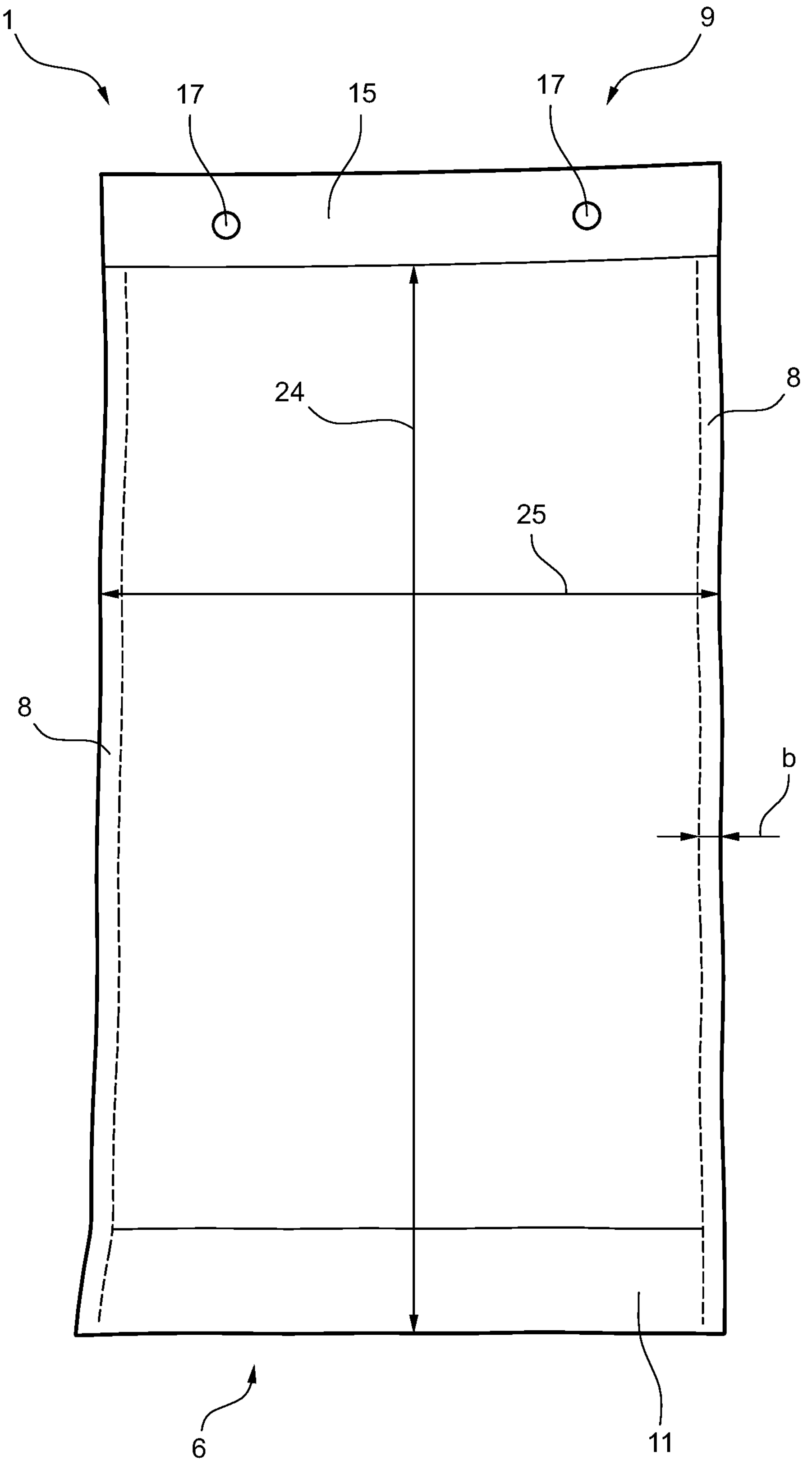
FIG. 2 is a front view of an unfilled paper bag.

FIG. 2 shows a bag 1 produced by the process in the unfilled state, without the corners of the head gussets 11 having been punched away. This has a paper layer 2 forming a double-layer web 7 and a sealable coating 3 arranged in sections thereon, which faces a bag interior. The bag has a rectangular shape with a longitudinal dimension 24 corresponding to the length of the second coating strips 5 and a transverse dimension 25 corresponding to the length of the first coating strips 4. The bag 1 has an inlaid head gusset 11 in the region of a folding arrangement 6, so that the web of material forming the bag is folded back onto itself by means of three folds to form a front bag wall and a rear bag wall. The superimposed material web sections have aligned side edges extending along the longitudinal dimension of the bag. In the region of the side edges, the front and the rear bag walls are heat-sealed to one another over a width b corresponding to half the width B2 of the second coating strips 5, so that in each case 1 cm wide sealing seams 8 formed as flat seams join the bag walls to one another. In the region of the head gusset 11, the front and rear bag walls are not welded directly to one another, but the front bag wall is welded to the head gusset section facing it and the rear bag wall is welded to the head gusset section facing it. Opposite the head gusset 11, the bag has an opening 9 which is surrounded on the inside by the first coating strips 4, so that the opening 9 can also be sealed after the bag has been filled with hygiene articles. A projecting material section 15 projecting beyond the bag opening 9 is provided on the rear bag wall. Two holes 17 are provided in the material section 15, which serve to fasten the bag 1 on wicket pins.

Figure 6:
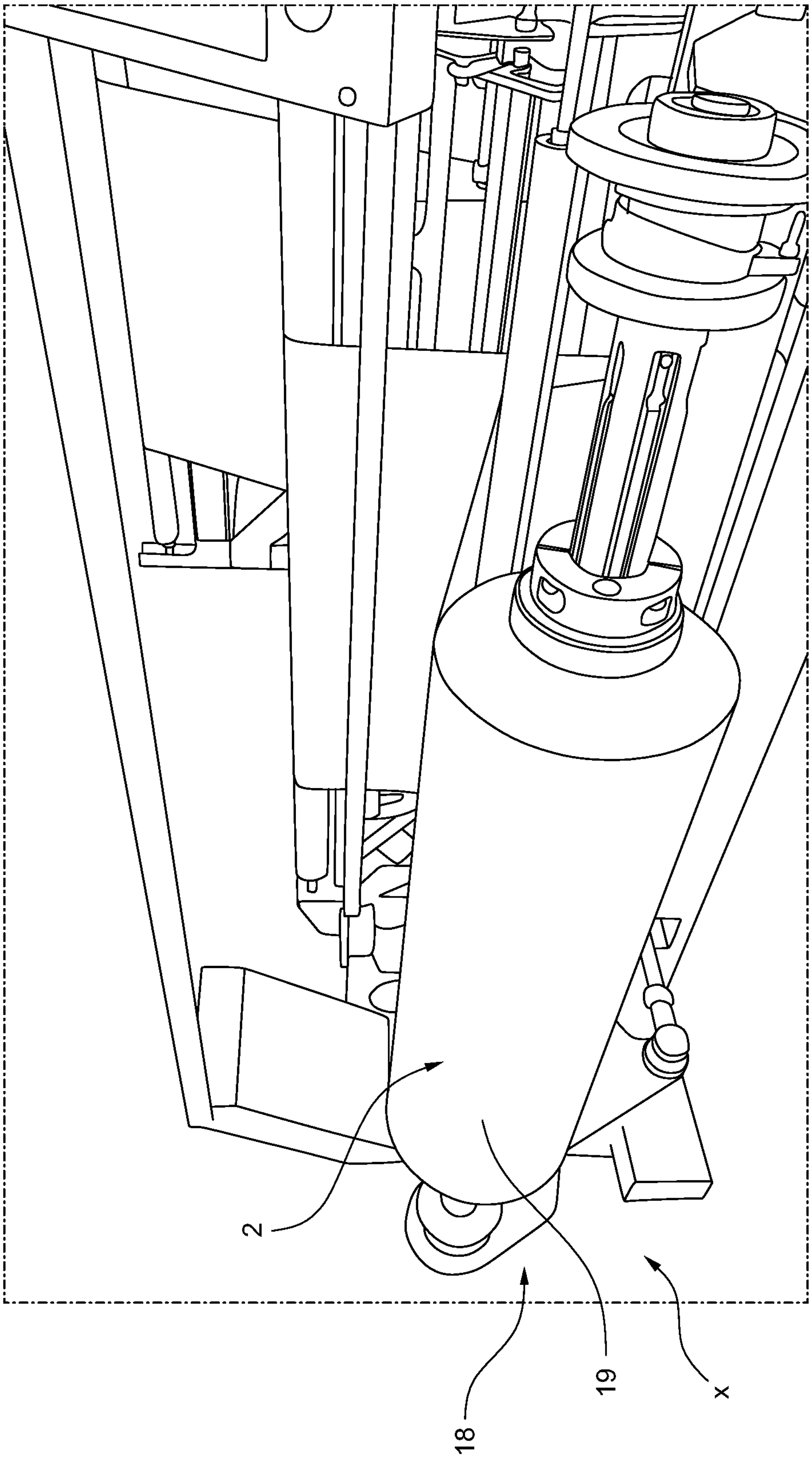
FIG. 6 is a perspective view of a paper web feeding device.
Figure 7:
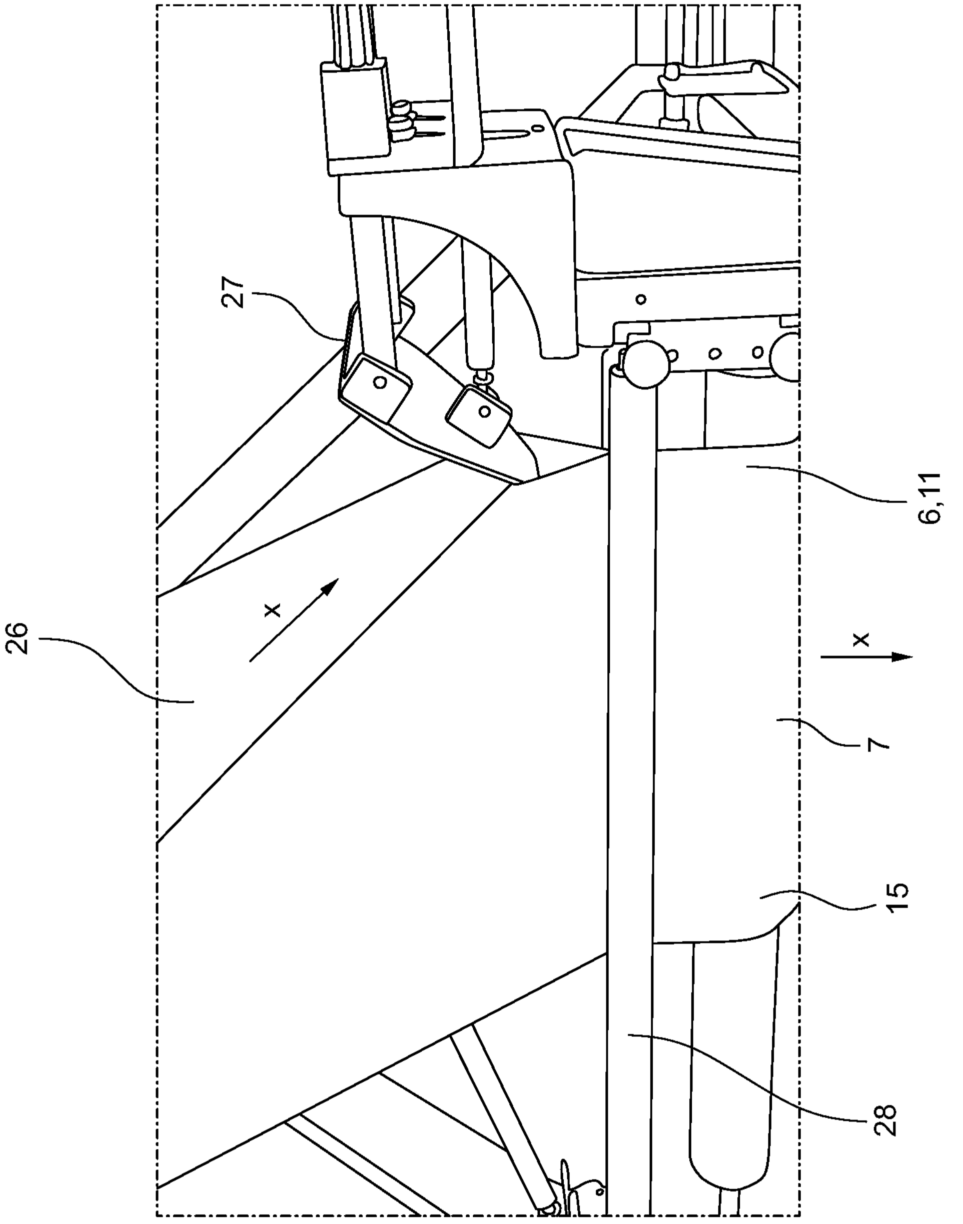
FIG. 7 is a perspective view of a device for folding the paper web and inserting a head gusset.
Figure 8:
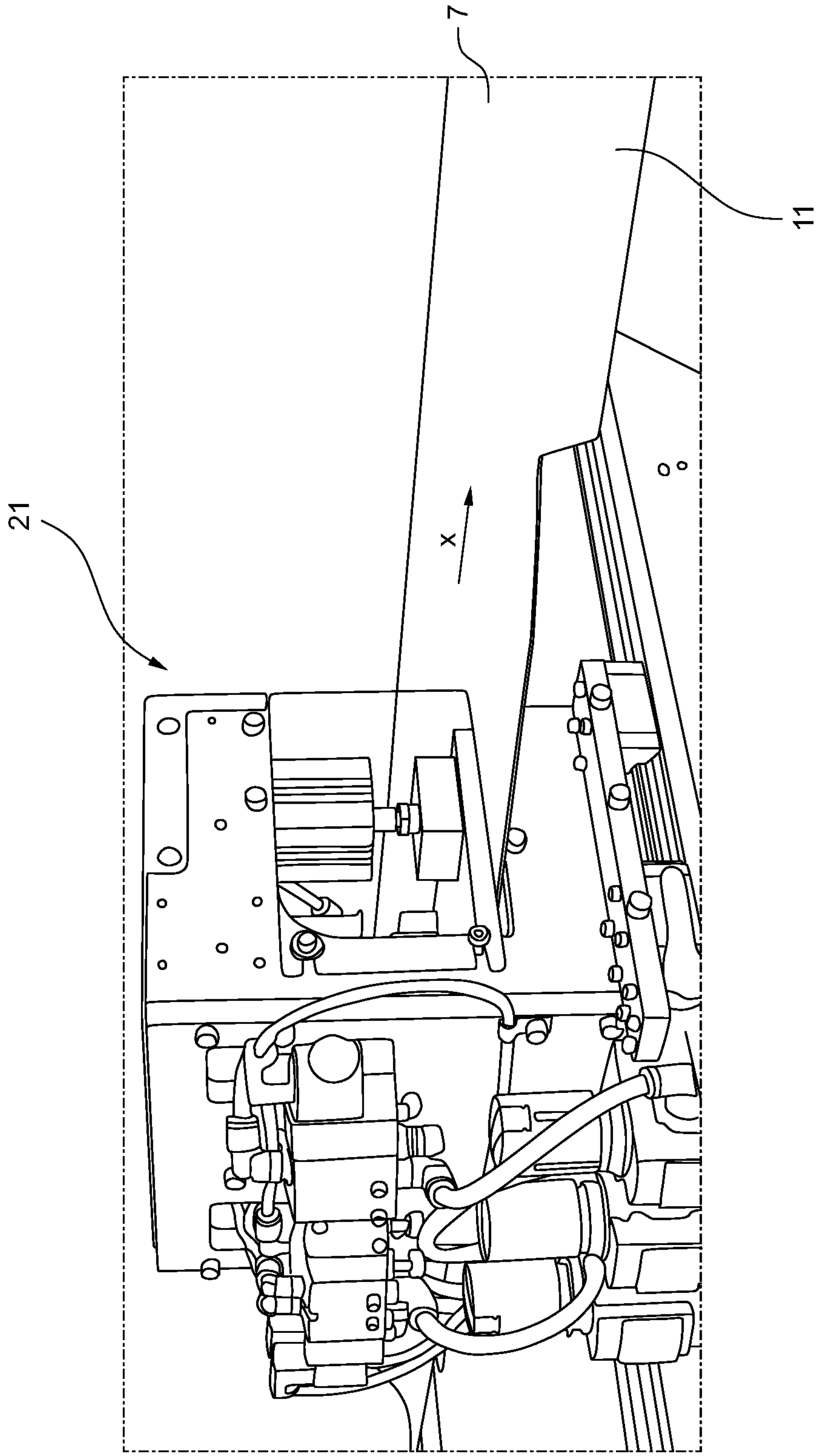
FIG. 8 is a perspective view of a device for punching the folded paper web.
Figure 9:
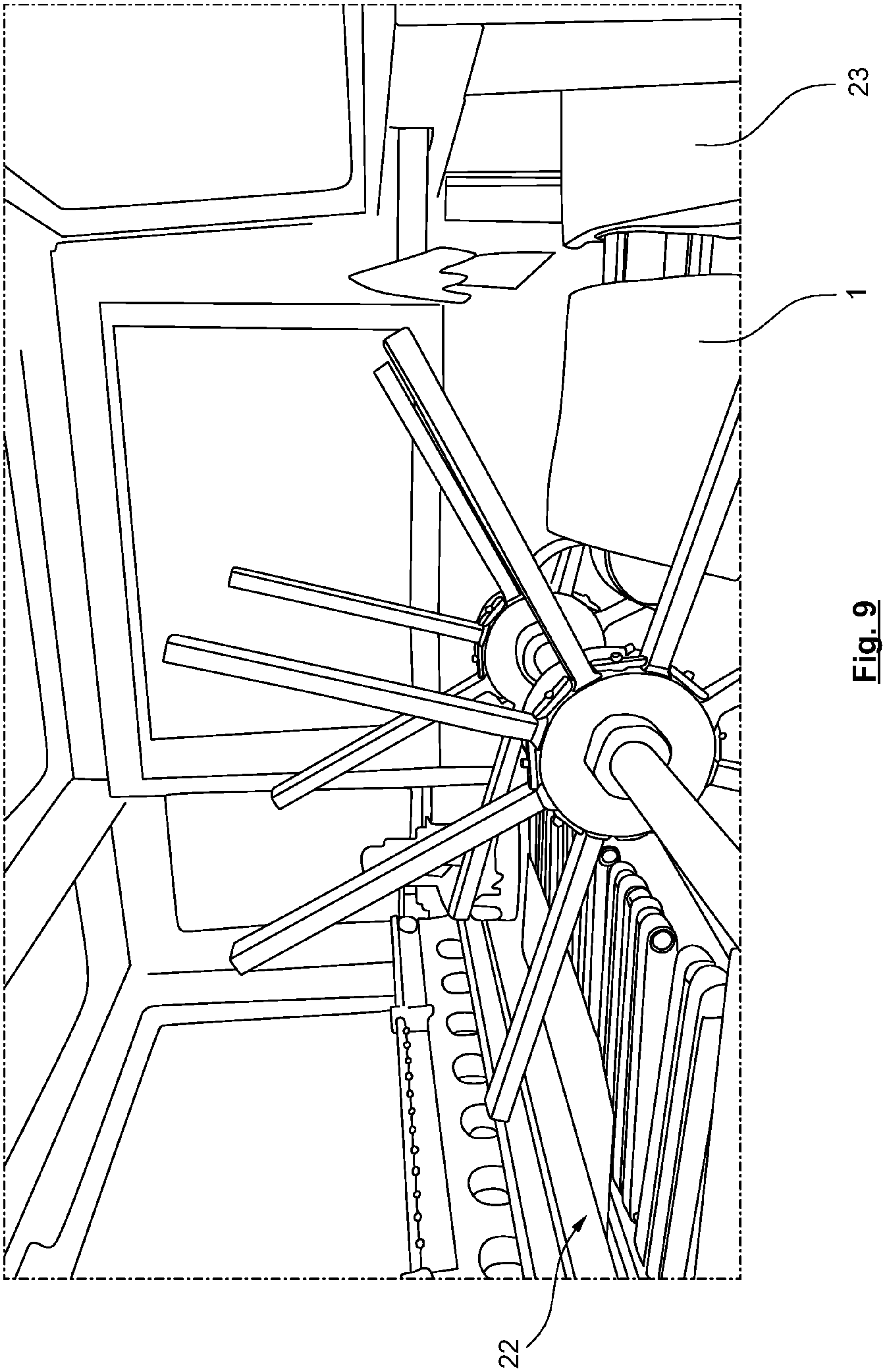
FIG. 9 is a perspective view of a device for separating the folded and sealed paper web into individual paper bags and a stack of paper bags.

FIGS. 6 to 9 show individual stations of a system for the production of paper bags 1 which can be filled with hygiene articles and which carries out the process. FIG. 6 shows a feed device 18 for conveying a paper web 2. The paper web 2 is thereby provided on a paper roll 19, from which the paper web 2 is continuously unwound and fed to the manufacturing process. FIG. 7 shows a folding device 20 for folding the paper web 2 into a double-layer web 7, which has a folding wedge 26 tapering in the conveying direction X, over which the paper web 2 is guided. Starting from its outer sides in the direction of the web center, the paper web 2 is folded over along the outer edges of the folding wedge 26 in the direction of the rear side of the folding wedge 26. In the course of this, the paper web 2 changes its conveying direction X. An insertion wedge 27 is arranged at the tip of the folding wedge 26 against the folding wedge direction, by means of which the folding arrangement 6 with inserted head gusset 11 is produced. This produces a double-layered web 7, which is guided through the nip of a pair of rollers in which the intended folds are introduced into the paper web 2. On the opposite side of the head gusset 11, it can be seen that the double-layer paper web 7 has a projecting material section 15. After the first and second coating strips 4, 5 have been sealed, the double-layered web 7 is fed to a punching device 21 as shown in FIG. 8, which removes the projecting corner sections of the head gussets 11 in each case. Finally, in FIG. 9, a separating device 22 is shown which separates the double-layered web 7 along the provided separation lines 16 into individual paper bags 1, the separation lines 16 running along the second coating strips 5 as described above and separating them into two side seams 8 of adjacent bags 1. Finally, the made-up, partially sealed, punched and separated bags 1 are deposited on a bag stack 23. Thus, the bags are ready to be filled via the opening 9 in a subsequent process and then sealed along the first coating strips 4.

The features of the invention disclosed in the foregoing description, in the drawings as well as in the claims may be essential to the realization of the invention both individually and in any combination.

What is claimed is:

1. A method of manufacturing a paper bag (1) for containing sanitary products, comprising:

Conveying a paper web (2) having a first and a second side in a conveying direction (X);

Applying, section-by-section, a sealable coating (3) to the first side of the paper web (2), said applying comprising the application of first coating strips (4) extending essentially in the conveying direction (X) and spaced apart from one another transversely with respect to the conveying direction (X), and said applying further comprising the application of second coating strips (5) extending essentially transversely with respect to the conveying direction (X) and spaced apart from one another in the conveying direction (X);

Folding onto itself the first side of the paper web (2) along the conveying direction (X) so as to form a two-ply web (7) having a folding arrangement (6);

Heat sealing the second coating strips (5) to produce side seams (8) each limiting a bag interior;

Separating the two-ply web (7) along the heat-sealed side seams (8) to separate the two-ply web (7) into individual paper bags (1);

wherein said applying, section-by-section, of the sealable coating (3) to the first side of the paper web (2) further comprises applying in the conveying direction (X) coating sections (12) extending towards one another in the region of the folding arrangement (6), at least two of first coating strips (4), second coating strips (5) and coating sections (12) being produced by different application methods.

2. The method according to claim 1, wherein at least the coating material used for the sealable coating (3) of the first coating strips (4) is different from that used for the second coating strips (5) and the coating sections (12).

3. The method according to claim 1, wherein the coating material used for the first coating strips (4) is heat reactivatable.

4. The method according to claim 1, wherein the application of the first coating strips (4) is carried out by means of an endless roller, which is arranged such that the distance between the two first coating strips (4) can be adjusted.

5. The method according to claim 1, wherein said applying, section-by-section, of the sealable coating (3) to the first side of the paper web (2) comprises applying the first coating strips (4) in a first process step and applying the second coating strips (5) and/or the coating sections (12) in a second process step.

6. The method according to claim 1, wherein the first coating strips (4) are arranged on opposite side edges of the paper web (2), so that the first coating strips (4), in the folded onto itself state of the paper web (4), delimit a bag opening (9) via which the bag interior is accessible.

7. The method according to claim 6, wherein at least one free area (10), which is free of sealable coating (3), is formed between the opposing first coating strips (4) and between two adjacent second coating strips (5).

8. The method according to claim 1, wherein said folding onto itself comprises inserting a head gusset (11) in the region of the folding arrangement (6).

9. The method according to claim 1, wherein the coating sections (12) are directly adjacent to the second coating strips (5).

10. The method according to claim 1, wherein the coating sections (12) are spaced from the second coating strips (5) transversely to the conveying direction (x).

11. The method according to claim 1, wherein the width of the coating sections (12) transverse to the conveying direction (X) substantially corresponds to the width (BK) of the paper web section (13) provided for the head gusset (11).

12. The method according to claim 1, wherein said applying, section-by-section, of the first and/or the second coating strips (4, 5) and/or the coating sections (12) to the first side of the paper web (2) takes place only on one side of one of the paper web sections to be folded onto itself and separated by the folding arrangement (6).

13. The method according to claim 1, wherein the coating pattern applied in sections is formed mirror-symmetrically in the conveying direction (X), so that when the paper web (2) is folded onto itself, sections having a sealable coating (3) are folded onto itself.

14. The method according to claim 1, wherein partially heat sealing the applied sealable coating (3) further comprises heat sealing the coating sections (12) to create head gusset seams (14).

15. The method according to claim 1, wherein the folding onto itself of the paper web (2) takes place off-center with respect to the paper web width (B), so that one of the layers of the two-layer web (7) has a projecting material section (15).

16. The method according to claim 1, wherein the first coating strips (4) are applied to the paper web (2) without interruption, i.e., as continuous coating strips (4).

17. The method according to claim 1, wherein the distance (A1) between the first coating strips (4) and/or the respective width (B1) of the first coating strips (4) can be variably adjusted.

18. The method according to claim 1, wherein the distance (A2) between the second coating strips (5) and/or the length (L2) and/or the width (B2) of the second coating strips (5) are variably adjustable.

19. The method according to claim 1, wherein the dimensions (B3, L3) of the coating sections (12) are variably adjustable in and transversely to the conveying direction (X).

20. The method according to claim 1, wherein said applying of the sealable coating (3) is carried out by means of gravure printing and/or flexographic printing and/or nozzle application and/or spraying.

21. The method according to claim 1, wherein, prior to the sectional application of a sealable coating (3) to the first side of the paper web (2), the second side of the paper web (2) is printed with a motif.

22. The method according to claim 1, wherein after separating the two-ply web (7) along the heat-sealed side seams (8) to separate the two-ply web (7) into individual paper bags, the method comprises pinning the individual paper bags onto wicket pins.

* * * * *